United States Patent [19]
Lomet et al.

[11] Patent Number: 5,524,205
[45] Date of Patent: Jun. 4, 1996

[54] METHODS AND APPARATUS FOR OPTIMIZING UNDO LOG USAGE

[75] Inventors: David B. Lomet, Westford, Mass.; Peter M. Spiro, Nashua, N.H.; Ashok M. Joshi, Nashua, N.H.; Ananth Raghavan, Nashua, N.H.; Tirumanjanam K. Rengarajan, Nashua, N.H.

[73] Assignee: Oracle Corporation, Redwood Shores, Calif.

[21] Appl. No.: 50,747

[22] Filed: Apr. 21, 1993

Related U.S. Application Data

[63] Continuation of Ser. No. 546,306, Jul. 2, 1990, which is a continuation-in-part of Ser. No. 548,720, Jun. 29, 1990.

[51] Int. Cl.$^6$ .................................................. G06F 12/16
[52] U.S. Cl. ..................... 395/182.14; 395/488
[58] Field of Search .............................. 395/575, 182.14; 371/12

[56] References Cited

U.S. PATENT DOCUMENTS

| | | | |
|---|---|---|---|
| 4,498,145 | 2/1985 | Baker et al. | 395/600 |
| 4,507,751 | 3/1985 | Gawlick et al. | 395/575 |
| 4,686,620 | 8/1987 | Ng | 395/600 |
| 4,751,702 | 6/1988 | Beier et al. | 371/9.1 |
| 4,853,843 | 8/1989 | Ecklund | 395/600 |
| 4,868,744 | 9/1989 | Reinsch et al. | 364/280.3 |
| 4,878,167 | 10/1989 | Kapulka et al. | 395/575 |
| 4,945,474 | 7/1990 | Elliott et al. | 395/575 |
| 5,043,866 | 8/1991 | Myre, Jr. et al. | 395/600 |

OTHER PUBLICATIONS

VAX Rdb/VMS V4.0 Support Internals Student Guide (Oct. 1, 1990).
Rothermel, et al., "ARIES/NT: A Recovery Method Based on Write-Ahead Logging for Nested Transactions," Proceedings of the Fifteenth International Conference on Very Large Data Bases, (1989), pp. 337–346.
C. Mohan, et al., "A Case Study of Problems of Migrating to Distributed Computing: Data Base Recovery Using Multiple Logs in the Shared Disks Environment," Research Report, (1990), pp. 1–15.
C. Mohan, et al., "ARIES: A Transaction Recovery Method Supporting Fine–Granularity Locking and Partial Rollbacks Using Write–Ahead Logging," Research Report, (1989), pp. 1–45.
Crus, "Data Recovery in IBM Database 2," IBM Systems Journal, vol. 23, No. 2, 1984, pp. 178–188.
Gray, "Notes on Data Base Operating Systems," Research Report, (1978), pp. 1–111.
Kronenberg et al., "VAXclusters: A Closely–Coupled Distributed System," ACM Transactions on Computer Systems, vol. 4, No. 2, May 1986, pp. 130–146.
Lindsay, et al., "Notes on Distributed Databases," Research Report, (1979), pp. 1–57.
Rengarajan et al., "High Availability Mechanisms of VAX DBMS Software," Digital Technical Journal, No. 8, Feb. 1989, pp. 88–98.
C. Mohan, et al., "ARIES: A Transaction Recovery Method Supporting Fine–Granularity Locking and Partial Rollbacks Using Write–Ahead Logging," Research Report, (1989), pp. 1–45.
Stonebraker, "The Case for Shared Nothing," University of California, Berkely, pp. 4–8.

(List continued on next page.)

*Primary Examiner*—Stephen M. Baker
*Attorney, Agent, or Firm*—Blakely, Sokoloff, Taylor & Zafman

[57] ABSTRACT

Each node in a data processing system contains at least one undo buffer and one least one redo buffer for insuring that any changes made to a section of a non-volatile storage medium, such as a disk, can be removed, if a transaction has not been committed, or can be recreated if the transaction has not been committed. The undo buffers each correspond to a different uncommitted transaction. The redo buffer contains the changes made to a copy of the section which is maintained in the memory.

7 Claims, 10 Drawing Sheets

OTHER PUBLICATIONS

Shoens, "Data Sharing vs. Partitioning for Capacity and Availability," IBM San Jose Research Laboratory K55/281, pp. 10–16.

Shoens, et al., "The Amoeba Project," IEEE (1985), pp. 102–105 Strickland, et al., IMS/VS: An evolving system, IBM SYST J, vol. 21, No. 4, (1982), pp. 490–513.

Bhide, "An Analysis of Three Transaction Processing Architectures," Proceedings of the 14th VLDB Conference, Los Angeles, California, (1988), pp. 339–350.

Kohler, W., "Overview of Synchronization and Recovery Problems in Distributed Databases", *Fall COMPCON 80,* Sep. 23–25, 1980, pp. 433–441.

Yelavich, B., "Customer Information Control System–An evolving system facility", *IBM Systems Journal,* vol. 24, Nos. 3/4, 1985, pp. 264–278.

DIRTY BLOCKS TABLE

| 1200 ↓ TID | 1210 STATE | 1220 ULOG LOG | 1230 | 1240 HIGH | 1250 NEXT |
|---|---|---|---|---|---|
| 1201 | | | | | |
| 1202 | | | | | |
| ≈ | ≈ | ≈ | ≈ | ≈ | ≈ |
| 1207 | | | | | |

ACTIVE TRANSACTIONS TABLE

FIG. 12

METHODS AND APPARATUS FOR OPTIMIZING UNDO LOG USAGE

This application is a continuation of, Ser. No. 07/546,306, filed Jul. 2, 1990, abandoned, which is a continuation in part of 07/548,720, filed in Jun. 29, 1990, abandoned.

I. BACKGROUND OF THE INVENTION

The application is related to U.S. Ser. No. 07/549,183 for Methods and Apparatus for Managing State Identifiers for Efficient Recovery, filed Jun. 29, 1990 (now abandoned), and U.S. Ser. No. 07/546,454, with the same title, and filed Jul. 2, 1990 (now abandoned).

The present invention relates generally to the field of recovery from crashes in shared disk systems, and in particular, to the use of logs in such recovery.

All computer systems may lose data if the computer crashes. Some systems, like data base systems, are particularly susceptible to possible loss of data from system failure or crash because those systems transfer great amounts of data back and forth between disks and processor memory.

The common reason for data loss is incomplete transfer of data from a volatile storage system (e.g., processor memory) to a persistent storage system (e.g., disk). Often the incomplete transfer occurs because a transaction is taking place when a crash occurs. A transaction generally includes the transfer of a series of records (or changes) between the two storage systems.

A concept that is important in addressing data loss and recovery from that loss is the idea of "committing" a transaction. A transaction is "committed" when there is some guarantee that all the effects of the transaction are stable in the persistent storage. If a crash occurs before a transaction commits, the steps necessary for recovery are different from those necessary for recovery if a crash occurs after a transaction commits. Recovery is the process of making corrections to a data base which will allow the complete system to restart at a known and desired point.

The type of recovery needed depends, of course, on the reason for the loss of data. If a computer system crashes, the recovery needs to enable the restoration of the persistent storage, e.g. disks, of the computer system to a state consistent with that produced by the last committed transactions. If the persistent storage crashes (called a media failure), the recovery needs to recreate the data stored onto the disk.

Many approaches for recovering data base systems involve the use of logs. Logs are merely lists of time-ordered actions which indicate, at least in the case of data base systems, what changes were made to the data base and in what order those changes were made. The logs thus allow a computer system to place the data base in a known and desired state which can then be used to redo or undo changes.

Logs are difficult to manage, however, in system configurations where a number of computer systems, called "nodes," access a collection of shared disks. This type of configuration is called a "cluster" or a "shared disk" system. A system that allows any nodes in such a system to access any of the data is called a "data sharing" system.

A data sharing system performs "data shipping" by which the data blocks themselves are sent from the disk to the requesting computer. In contrast, a function shipping system, which is better known as a "partitioned" system, ships a collection of operations to the computer designated as the "server" for a partition of the data. The server then performs the operations and ships the results back to the requestor.

In partitioned systems, as in single node or centralized systems, each portion of data can reside in the local memory of at most one node. Further, both partitioned systems and centralized systems need only record actions on a single log. Just as importantly, data recovery can proceed based solely on the contents of one log.

Distributed data shipping systems, on the other hand, are decentralized so the same data can reside in the local memories of multiple nodes and be updated from these nodes. This results in multiple nodes logging actions for the same data.

To avoid the problem of multiple logs containing actions for the same data, a data sharing system may require that the log records for the data be shipped back to a single log that is responsible for recording recovery information for the data. Such "remote" logging requires extra system resources, however, because extra messages containing the log records are needed in addition to the I/O writes for the log. Furthermore, the delay involved in waiting for an acknowledgment from the logging computer can be substantial. Not only will this increase response time, it may reduce the ability to allow several users to have concurrent access to the same data base.

Another alternative is to synchronize the use of a common log by taking turns writing to that log. This too is expensive, as it involves extra messages for the coordination.

These difficulties are important to address because data sharing systems are often preferable to partitioned systems. For example, data sharing systems are important for workstations and engineering design applications because data sharing systems allow the workstations to cache data for extended periods which permits high performance local processing of the data. Furthermore, data sharing systems are inherently fault-tolerant and achieve load balancing because a multiplicity of nodes can access the data simultaneously, manage some local data themselves, and share other data with other host computers and workstations.

It is therefore an object of this invention to ease redo log management by removing undo information from redo records.

Another object of this invention is to provide easier management of undo information by discarding undo information when a transaction commits.

Another object of this invention is to minimize the information which must be stored to undo transactions in case of crashes or failures.

II. SUMMARY OF THE INVENTION

The present invention avoids the problem of the prior art by ensuring that sufficient information from redo and undo buffers is maintained so that all changes of uncommitted transactions can be removed, the changes from the committed transactions can be recreated, and the storage of the undo buffers into undo logs can be minimized. Further efficiencies may be maintained by keeping a count of actions in a transaction as the actions are undone.

Specifically, in a data processing system including a plurality of nodes and a non-volatile storage medium divided into sections, the plurality of nodes making changes to the sections by way of transactions, each transaction comprising a series of changes made to at least one section by at least one node, and each transaction being committed if a record of the changes effected by that transaction as well as an indication of the completion of that transaction are reliably stored on the storage medium, and otherwise being uncommitted, a first one of the plurality of nodes comprises several elements. They include: a memory for holding a copy of at least one section; processing means, coupled to the memory, for making changes to the copy of the at least one section in the memory; at least one undo buffer containing a sequential list of the changes made by the processing means to the copy of the at least one section in the memory, each undo buffer corresponding to changes made by the first node to a different uncommitted transaction; a redo buffer containing a sequential list of changes made by the processing means in the corresponding node to the copy of the at least one section in memory; storing means, coupled to the memory, for storing the copy of the at least one section back into the storage medium; and log management means, coupled to the undo buffers and to the redo buffer, for selectively storing the portions of the undo buffers and redo buffer to the storage medium to ensure that the effects of all changes of uncommitted transactions can be removed and the effects of all changes of committed transactions can be recreated.

The accompanying drawings, which are incorporated in and which constitute a part of this specification, illustrate preferred implementations of this invention and, together with the accompanying textual description, explain the principles of the invention.

III. BRIEF DESCRIPTION OF THE DRAWINGS

FIG. 12 is a diagram of an Active Transactions table;

IV. DESCRIPTION OF THE PREFERRED IMPLEMENTATIONS

Reference will now be made in detail to preferred implementations of this invention, examples of which are illustrated in the accompanying drawings.

A. System components

System 100 is an example of a storage system which can be used to implement the present invention. System 100 includes several nodes 110, 120, and 130, all accessing a shared disk system 140. Each of the nodes 110, 120, and 130 includes a processor 113, 123, and 133, respectively, to execute the storage and recovery routines described below. Nodes 110, 120, and 130 also each include a memory 118, 128, and 138, respectively, to provide at least two functions. One of the functions is to act as a local memory for the corresponding processor, and the other function is to hold the data being exchanged with disk system 140. The portions of memory that are used for data exchange are called caches. Caches are generally volatile system storage.

Shared disk system 140 is also called "persistent storage." Persistent storage refers to non-volatile system storage whose contents are presumed to persist when part or all of the system crashes. Traditionally, this storage includes magnetic disk systems, but persistent storage could also include optical disk or magnetic tape systems as well.

Figure 1:
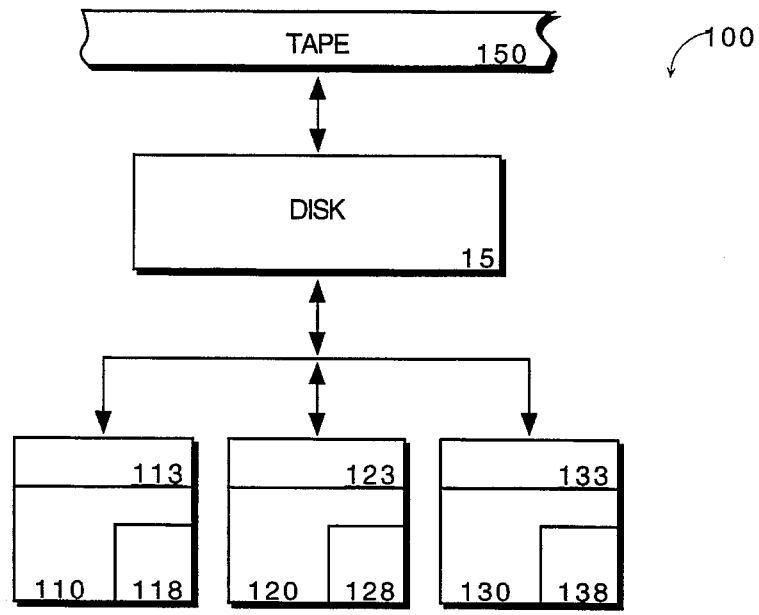
FIG. 1 is a diagram of a computer system for implementing this invention.

In addition, the persistent storage used to implement this invention is not limited to the architecture shown in FIG. 1. For example, the persistent storage could include several disks each coupled to a different node, with the nodes connected in some type of network.

Another part of persistent storage is a backup tape system 150 which is referred to as "archive storage." Archive storage is a term used generally to refer to the system storage used for information that permits reconstruction of the contents of persistent storage should the data in the persistent storage become unreadable. For example, should shared disk system 140 have a media failure, tape system 150 could be used to restore disk system 140. Archive storage frequently includes a magnetic tape system, but it could also include magnetic or optical disk systems as well.

Data in system 100 is usually stored in blocks, which are the recoverable objects of the system. In general, blocks can be operated upon only when they are in the cache of some node.

Figure 2:
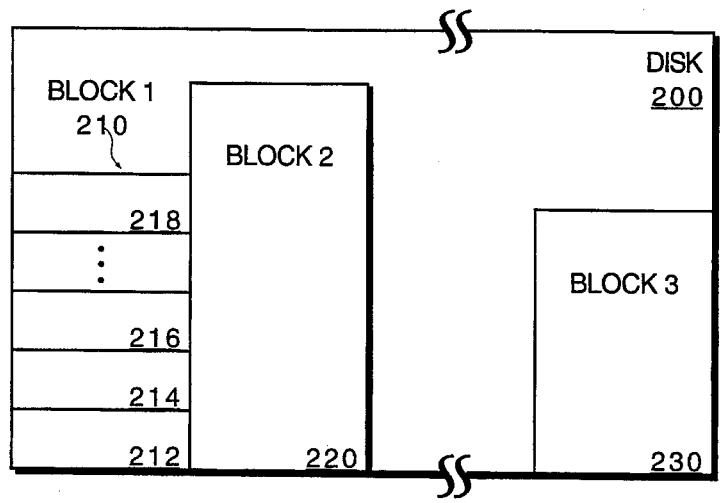
FIG. 2 is a diagram of a portion of a disk showing blocks and pages.

FIG. 2 shows an example of several blocks 210, 220, and 230 on a portion of a disk 200. Generally, a block contains an integral number of pages of persistent storage. For example, in FIG. 2, block 210 includes pages 212, 214, 216, and 218.

B. Logs

As explained above, most data base systems use logs for recovery purposes. The logs are generally stored in persistent storage. When a node is updating persistent storage, the node stores the log records describing the updates in a buffer in the node's cache.

The preferred implementation of the present invention envisions three types of logs in persistent storage, but only two types of buffers in each node's cache. The logs are redo logs, or RLOGs, undo logs, or ULOGs, and archive logs, or ALOGs. The buffers are the redo buffers and the undo buffers.

Figure 3:
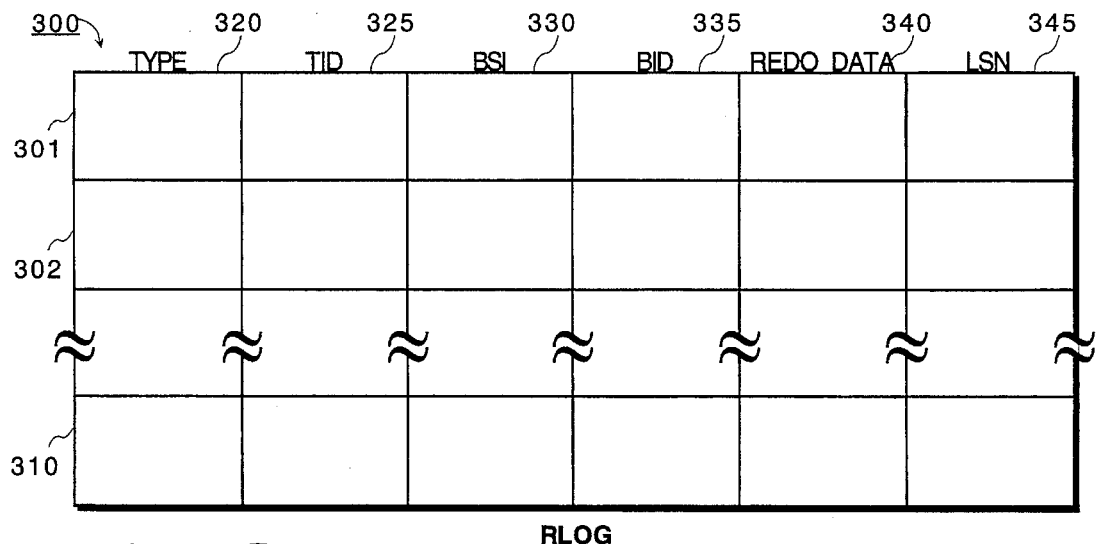
FIG. 3 is a diagram of a redo log.
Figure 4:
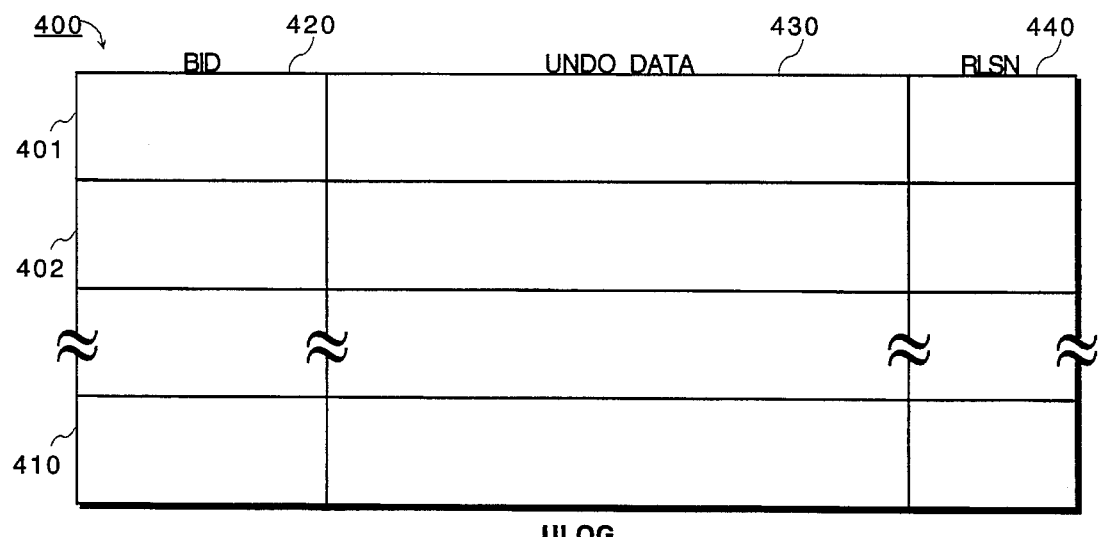
FIG. 4 is a diagram of an undo log.
Figure 5:
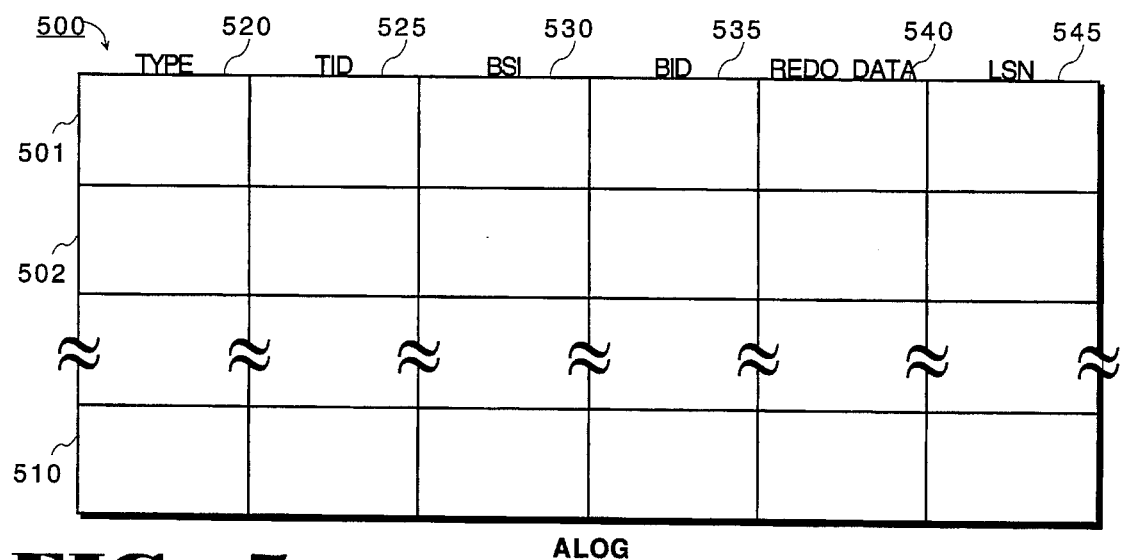
FIG. 5 is a diagram of an archive log.

An example of an RLOG is shown in FIG. 3, an example of a ULOG is shown in FIG. 4, and an example of an ALOG is shown in FIG. 5. The organization of a redo buffer is similar to the RLOG, and the organization of an undo buffer is similar to the ULOG.

A log sequence number, LSN, is the address or relative position of a record in a log. Each log maps LSNs to the records in that log.

1. RLOG

As shown in FIG. 3, RLOG 300 is a preferred implementation of a sequential file used to record information about changes that will permit the specific operations which took place during those changes to be repeated. Generally, those operations will need to be repeated during a recovery scheme once a block has been restored to the state at which logged actions were performed.

As FIG. 3 shows, RLOG 300 contains several records 301, 302, and 310, which each contain several attributes. TYPE attribute 320 identifies the type of the corresponding RLOG record. Examples of the different types of RLOG records are redo records, compensation log records, and commit-related records. These records are described below.

TID attribute 325 is a unique identifier for the transaction associated with the current record. This attribute is used to help find the record in the ULOG corresponding to the present RLOG record.

BSI attribute 330 is a "before state identifier." This identifier is described in greater detail below. Briefly, the BSI indicates the value of a state identifier for the version of the block prior to its modification by the corresponding transaction.

BID attribute 335 identifies the block modified by the update corresponding to the RLOG record.

REDO_DATA attribute 340 describes the nature of the corresponding action and provides enough information for the action to be redone. The term "update" is used broadly and interchangeably in this description with the term "action." Actions, in a strict sense, include not only record updates, but record inserts and deletes as well as block allocates and frees.

LSN attribute 345 uniquely identifies the current record on RLOG 300. As will be explained in detail below, LSN attribute 345 is used in the preferred implementation to control the redo sdan and checkpointing of the RLOG. LSN 345 is not stored in either RLOG records or in blocks in the preferred implementation. Instead, it is inherent from the position of the record in the RLOG.

One goal of this invention is to allow each node to manage its recovery as independently of the other nodes as possible. To do this, a separate RLOG is associated with each node. The association of an RLOG with a node in the preferred implementation involves use of a different RLOG for each node. Alternatively, the nodes can share RLOGs or each node can have multiple RLOGs. If an RLOG is private to a node, however, no synchronization involving messages is needed to coordinate the use of the RLOG with other RLOGs and nodes.

2. ULOG

In FIG. 4, ULOG 400 is a preferred implementation of a sequential file used to record information permitting operations on blocks to be undone correctly. ULOG 400 is used to restore blocks to conditions existing when a transaction began.

Unlike RLOGs, each ULOG and undo buffer is associated with a different transaction. Thus ULOGs and their corresponding buffers disappear as transactions commit, and new ULOGs appear as new transactions begin. Other possibilities exist.

ULOG 400 includes several records 401, 402, and 410, which each contain two fields. A BID field 420 identifies the block modified by the transaction logged with this record. An UNDO_DATA field 430 describes the nature of the update and provides enough information for the update to be undone.

RLSN field 440 identifies the RLOG record which describes the same action for which this action is the undo. This attribute provides the ability to identify each ULOG uniquely.

3. ALOG

In FIG. 5, ALOG 500 is a preferred implementation of a sequential file used to store redo log records for sufficient duration to provide media recovery, such as when the shared disk system 140 in FIG. 1 fails. The RLOG buffers are the source of information from which ALOG 500 is generated, and thus ALOG 500 has the same attributes as RLOG 300.

ALOGs are preferably formed from the truncated portions of corresponding RLOGs. The truncated portions are portions which are no longer needed to bring the persistent storage versions of blocks up to current versions. The records in the truncated portions of the RLOGs are still needed, however, should the persistent storage version of a block become unavailable and need to be recovered from the version of the block on archive storage.

Similar to RLOG 300, ALOG 500 includes several records 501, 502, and 503. Attributes TYPE 520, TID 525, BSI 530, BID 535, and REDO-DATA 540 have the same functions as the attributes in RLOG 300 of the same name. LSN 545, like LSN 345 for RLOG 300, identifies the ALOG record.

C. State Identifiers (and Write-Ahead Log Protocol)

In log-based systems, a log record is applied to a block only when the recorded state of the block is appropriate for the update designated by the log record. Thus, a sufficient condition for correct redo is to apply a logged transaction to a block when the block is in the same state as it was when the original action was performed. If the original action was correct, the redone action will also be correct.

It is unwieldy and impractical to store the entire contents of a block state on a log. Therefore, a proxy value or identifier is created for the block state. The identifier which is used in the preferred implementation is a state identifier, or SI. The SI has a unique value for each block. That value identifies the state of the block at some particular time, such as either before or after the performance of some operation upon the block.

The SI is much smaller than the complete state and can be inexpensively used in place of the complete state as long as the complete state can be recreated when necessary. An SI is "defined" by storing a particular value, called the "defining state identifier" or DSI, in the block. The DSI denotes the state of the block in which it is included.

State recreation can be accomplished by accessing the entire block stored in persistent storage during recovery and noting the DSI of that block. This block state is then brought up to date, as explained in detail below, by applying logged actions as appropriate.

A similar technique is described below for media recovery using the ALOG. Knowing whether a log record applies to a block involves being able to determine, from the log record, to what state the logged action applies. In accordance with the present invention, a block's DSI is used to determine when to begin applying log records to that block.

In a centralized or partitioned system, the physical sequencing of records on a single log is used to order the actions to be redone. That is, if action B on a block immediately follows action A on the block, then action B applies to the block state created by action A. So, if action A has been redone, the next log record to apply to the block will be action B.

Single log systems, such as centralized or partitioned systems, frequently use LSNs as SIs to identify block states. The LSN that serves as the DSI for a block identifies the last record in log sequence to have its effect reflected in the block. In such systems, the LSN of a log record can play the role of an "after state identifier" or ASI, which identifies the state of the block after the logged action. This is in contrast to a BSI (before state identifier) which is used in the present invention in a log record as described below.

In order to update the DSI and prepare for the next operation, it is also necessary to be able to determine the ASI for a block after applying the log record. It is useful to be able to derive the ASI from the log record, such as from the BSI, so the ASI need not be stored in log records, although the ASI can indeed be stored. The derivation must be one, however, that can be used during recovery as well as during normal operation. Preferably, the SIs are in a known sequence, such as the monotonically increasing set of integers beginning with zero. In this technique, the ASI is always one greater than the BSI.

When storing the updated block back to persistent storage, such as shared disk system 140, a Write-Ahead Log (WAL) protocol is used. The WAL protocol requires that the redo and undo buffers be written to the logs in shared disk system 140 before the blocks are written thereto. This ensures that the information necessary to repeat or undo the action is stably stored before changing the persistent copy of the data.

If the WAL protocol is not followed, and a block were to be written to persistent storage prior to the log record for the last update for the block, recovery could not occur under certain conditions. For example, an update at one node may cause a block containing uncommitted updates to be written to persistent storage. If the last update to that block has not been stored to the node's RLOG, and another transaction on a second node further updates the block and commits, the DSI for the block will be incremented. At the moment of commit for that second transaction, the logged actions for these other transactions are forced to the RLOG for the second node. Because the second update was generated by a different node, however, the writing of the log records for the second transaction does not assure that the log record for the uncommitted transaction on the original node is written.

If the original node crashes and the log record for the uncommitted transaction is never written to the RLOG, a gap is created in the ASI-BSI sequencing for the block. Should the block in persistent storage ever become unavailable, for example because of disk failure, recovery would fail because the ALOG merge, as explained below, requires a known and gapless sequence of SIs.

Thus, the WAL protocol is a necessary condition for an unbroken sequence of logged actions. It is also a sufficient condition with respect to block updates. When a block moves from one node's cache to another, the WAL protocol forces the RLOG records for all prior updates to the blocks to be changed by the committing transaction. "Forcing" means ensuring that the records in a nodes cache or buffer are stably stored in persistent storage.

By writing to persistent storage, the WAL protocol forces the writing of all records in the original node's RLOG up through the log record for the last update to the current block.

D. New Block Allocation

When a block has been freed, such as during normal disk storage management routines, and is later reallocated for further use, its DSI should not be set to zero because this activity results in non-unique state identifiers. If the DSI were set to zero, several log records might appear to apply to a block because they would have the same SI. Additional information would be needed to determine the correct log record. Thus, the DSI numbering used in the previous allocation must be preserved uninterrupted in the new allocation. Preferably, the BSI for a newly allocated block is the ASI of the block as it is freed.

One easy way to achieve uninterrupted SI numbering is to store a DSI in the block as a result of the free operation. When the block is reallocated, it is read, perhaps from persistent storage, and the normal DSI incrementing is continued. This treats allocation and freeing just like update operations. One problem with this solution is the necessity of reading newly reallocated blocks before using them. To make space management efficient with a minimum of I/O activity, however, it would be desirable to avoid the "read before allocation penalty."

The present invention gains efficiency by not writing the DSI for all unallocated blocks. For blocks not previously allocated, the initial DSI is always set at zero. Only the DSI for blocks that have been deallocated is stored. These DSIs are stored using the records already kept by the system for bookkeeping of free space in persistent storage. Usually such bookkeeping information is recorded in a collection of space management blocks.

By storing the initial SI for each deallocated block with this space management information, the initial SI's do not need to be stored in the blocks, thus eliminating the read before allocation penalty. On reallocation, the BSI for the "allocate" operation becomes the initial SI of this previous "free" block.

Of course, to make this procedure operate correctly, blocks containing space management information must be periodically written to persistent storage, and one node must not be allowed to reallocate blocks freed by another node until the freed blocks' existence is made known to it via this bookkeeping. Thus, maintaining initial SI's for freed blocks does not cause additional reading or writing of the free space bookkeeping information.

Although adding SI information for free blocks does increase the amount of space management information needed in this system, there are two reasons why system efficiency should not suffer too much. First, most of the free space is characterized as "never before allocated," and thus already has an initial SI of zero. Second, the previously used free space is small in most data bases because data bases are usually growing. Because the initial SIs are stored individually only for the reallocated blocks, the increased storage for SIs should be small.

Alternatively, the never-before-allocated blocks could be distinguished from reallocated ones. The SI for the reallocated blocks could then be read from persistent storage when those blocks are allocated. This would create a read before allocation penalty, however, although the penalty would be light for the reasons discussed above.

E. Recovery

1. Block Versions

To understand how the logs can be used in recovery, it is necessary to understand the different versions of blocks that may be available after a crash. These versions may be characterized in terms of how many of the logged updates on how many logs are needed to make the available version current. This has obvious impact with respect to how extensive or localized recovery activity will be.

For purposes of recovery, there are three kinds of blocks. A version of a block is "current" if all updates that have been performed on the block are reflected in the version. A block having a current version after a failure needs no redo recovery. When dealing with unpredictable system failures, however, one cannot ensure that all blocks are current without always "writing-thru" the cache to persistent storage whenever an update occurs. This is expensive and is rarely done.

A version of a block is "one-log" if only one node's log has updates that have not yet been applied to the block. When a failure occurs, at most one node need be involved in recovery. This is desirable because it avoids potentially extensive coordination during recovery, as well as additional implementation cost.

A version of a block is "N-log" if more than one node's log can have updates that have not yet been applied to it. Recovery is generally more difficult for N-log blocks than one-log blocks, but it is impractical when providing media recovery to ensure that blocks are always one-log because this would involve writing a block to archive storage every time the block changes nodes.

2. Redo Recovery

Without care, some blocks will be N-log at the time of a system crash (as opposed to a media failure). The preferred implementation of this invention, however, guarantees that all blocks will be one-log blocks for system crash recovery. This is advantageous because N-log blocks can require complex coordination between nodes for their recovery. Although such coordination is possible since the updates were originally sequenced during normal system operation using distributed concurrency control, such concurrency control requires overhead which should be avoided during recovery.

All blocks can be guaranteed to be one-log with respect to redo recovery by requiring "dirty" blocks to be written to persistent storage before they are moved from one cache to another. A dirty block is one whose version in the cache has been updated since the block was read from persistent storage.

If this rule is followed, a requesting node always gets a clean block when the block enters the new node's cache. Furthermore, during recovery, only the records on the log of the last node to change the block need be applied to the block. All other actions of other nodes have already been captured in the state of the block in persistent storage. Thus, all blocks will be one-log for redo recovery, so redo recovery will not require distributed concurrency control.

Following this technique does not mean that multiple logs will never contain records for a block. This technique merely ensures that only one node's records are applicable to the version of the block in persistent storage.

Furthermore, although one-log redo recovery is being assumed for system crashes, in order to perform media recovery, redo actions on multiple logs may have to be applied to avoid writing each block to archive storage every time the block moves between caches. Hence, it is still necessary in certain circumstances to order the logged actions across all the logs to provide recovery for N-log blocks. This can be accomplished, however, because of the sequential SIs.

Figure 6:
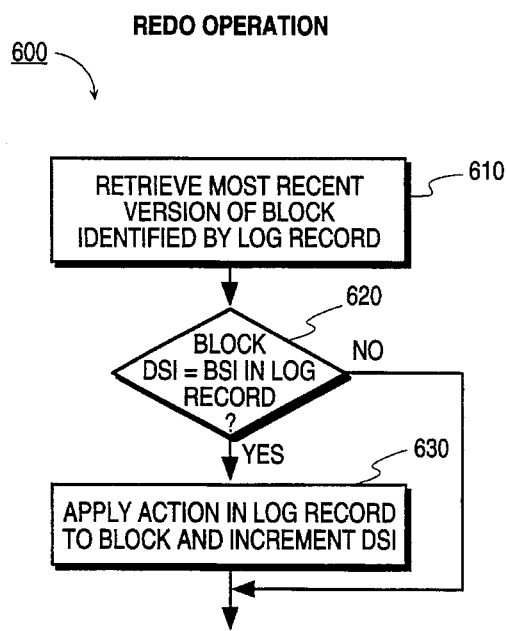
FIG. 6 is a flow diagram for performing a redo operation.

FIG. 6 shows a flow diagram 600 of the basic steps for a redo operation using the RLOG and the SIs described above. The redo operation represented by flow diagram 600 would be performed by a single node using a single RLOG record applied to a single block.

First, the most recent version of the block identified by the log record would be retrieved from the persistent storage (step 610). If the DSI stored in that retrieved block is equal to the BSI stored in the log record (step 620), then the action indicated in the log record is applied to the block and the DSI is incremented to reflect the new state of the block (step 630). Otherwise, that update is not applied to the block.

The redo operation described with regard to FIG. 6 is possible because the BSIs and ASIs can be determined at the time of recovery. Thus one can determine for each log which log records need to be redone, and this determination can be independent of the contents of other logs. The only comparison that needs to be made between block DSIs and log record BSIs is one of equality.

Figure 7:
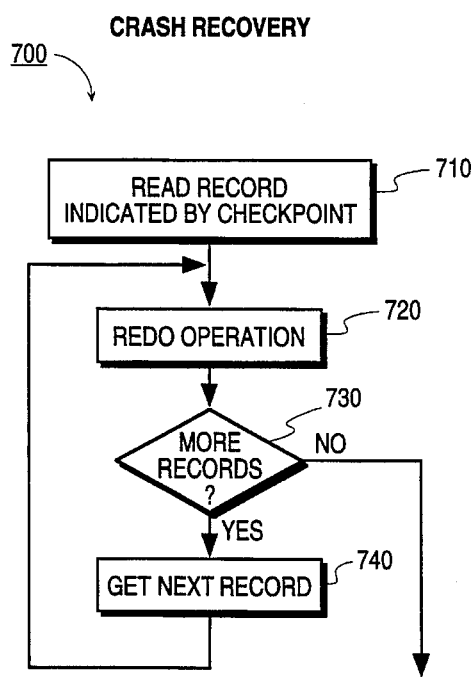
FIG. 7 is a flow diagram for performing crash recovery.

The redo operation described with regard to FIG. 6 can be used in recovering from system crashes. An example of a procedure of crash recovery is shown by the flow diagram 700 in FIG. 7. A single node can execute this crash recovery procedure independently of other nodes.

The first step would be for the node to read the first RLOG record indicated by the most recent checkpoint (step 710). The checkpoint, as described below, indicates the point in the RLOG which contains the record corresponding to the oldest update that needs to be applied.

The redo operation shown in FIG. 6 is then performed to see whether to apply the action specified in that log record to the block identified in that log record (step 720).

If, after performing the redo operation, there are no more records (step 730), then crash recovery is complete. Otherwise, the next record is retrieved from the RLOG (step 740), and the redo operation (step 720) shown in FIG. 6 is repeated.

If the SI associated with a log record is a monotonically increasing ASI, the test of whether a log record applies to a block in some state is whether this ASI is the first one greater than the block's DSI. This is sufficient only for one-log recovery, however, because in that case only one log will have records with ASIs that are greater than the DSI in the block.

In the preferred implementation of this invention, however, each log record includes the precise identity of the block state before a logged action is performed. As explained above, this is the "before state identifier" or BSI.

3. Multiple log redo for media recovery

Media recovery has many of the same characteristics as crash recovery. For example, there needs to be a stably stored version against which log records are applied.

There are also important differences. First, the stable version of the block against which the ALOG records are applied is the version last posted to archive storage.

Media recovery is N-log because it involves restoring blocks from archive storage and, as explained above, blocks are not written to archive storage every time they move between caches. Thus the technique of writing blocks to storage to avoid N-log recovery for system crashes cannot be used for media recovery.

Managing media recovery is difficult without merging the ALOGs. If the ALOGs are not merged, then the recovery involves constant searching for applicable log records. In merging ALOGs, there is a substantial advantage in using BSIs.

Figure 8:
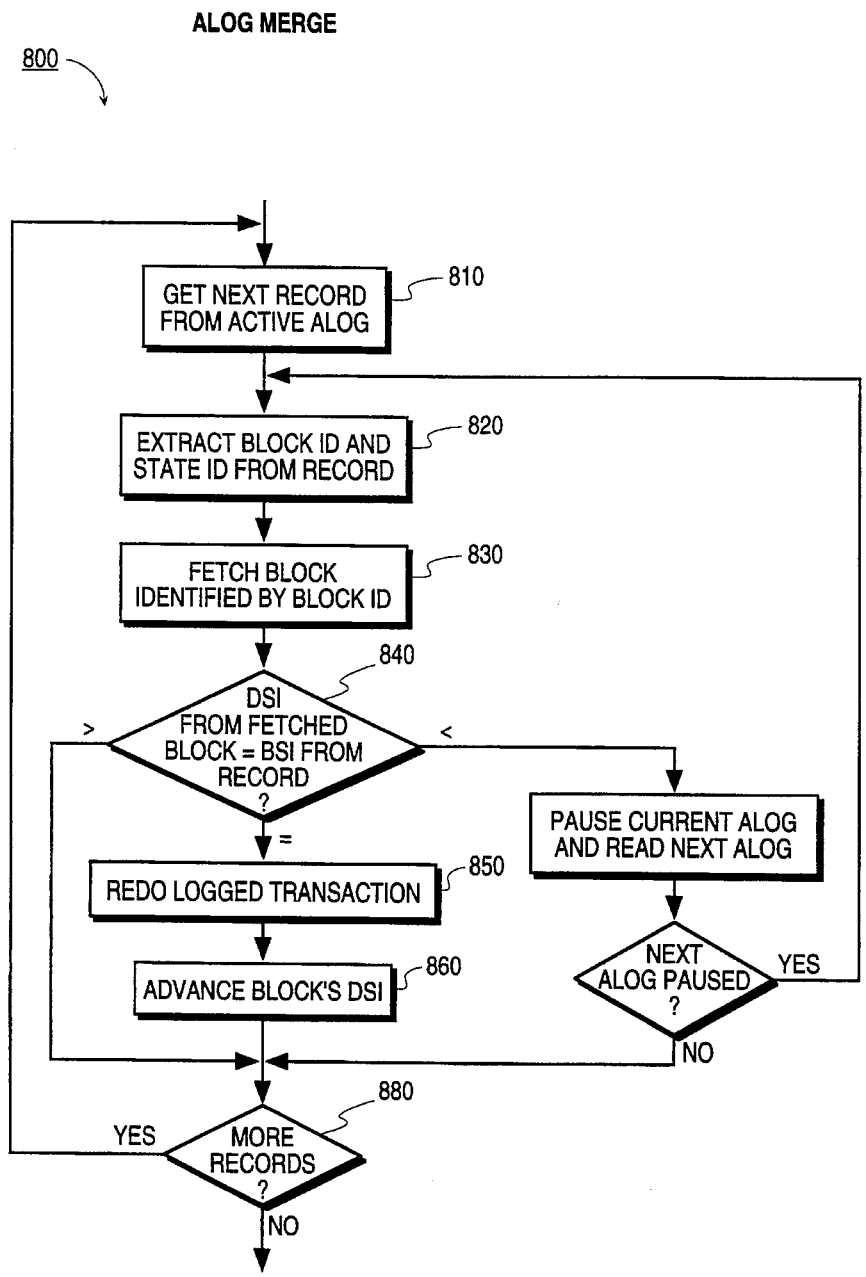
FIG. 8 is a flow diagram for merging archive logs.

FIG. 8 shows a procedure 800 for N-log media recovery involving the merger of the multiple ALOGs. The merging is not based on a total ordering among all log records, but on the partial ordering that results from the ordering among log records for the same block. At times there will be multiple ALOGs that have records whose actions can be applied to their respective blocks. As will be apparent from the description of procedure 800, it is immaterial which of these actions is applied first during media recovery.

It is faster and more efficient to permit the multiple ALOGs to be merged and applied to the backup data base in archive storage in a single pass. This can be done if the SIs are ordered properly. That is why, as explained above, the SIs are ordered in a known sequence, and the preferred implementation of this invention uses SIs that are monotonically increasing.

Beginning with any ALOG, the first log record is accessed (step 810). The Block ID and BSI are then extracted from that record (step 820). Next, the block identified by the Block ID is fetched (step 830).

Once the identified block is fetched, its DSI is read and compared to the ALOG record's BSI (step 840). If the ALOG's BSI is less than the block's DSI, the record is ignored because the logged action is already incorporated into the block, and redo is not needed.

If the ALOG record's BSI is equal to the block's DSI, then the logged action is redone by applying that action to the block (step 850). This is because the equality of the SIs means that the logged action applies to the current version of the block.

The block's DSI is then incremented (step 860). This reflects the fact that the application of the logged action has created a new (later) version of the block.

If the ALOG record's BSI is greater than the block's DSI, then it is not the proper time to apply the actions corresponding to the log record, and it is instead the proper time to apply the actions recorded on other ALOGs. Thus, the reading of this ALOG must pause and the reading of another ALOG is started (step 870).

If the other ALOG had been paused previously (step 880), then control is transferred to step 820 to extract the Block ID and the BSI of the log record which was current when that log was paused. If the log had not previously been paused, then control proceeds as if this were the first ALOG.

After all these steps, or if the other ALOG had never been previously paused, a determination is made whether any ALOG records remain (step 890). If so, the next record is fetched (step 810). Otherwise, the procedure 800 is ended.

When an ALOG is paused, there must be at least one other ALOG that contains records for the block that precede the current one. A paused ALOG with a waiting log record is simply regarded as an input stream whose first item (in an ordered sequence) compares later than the items in the other input streams (i.e., the other ALOGs). Processing continues using the other ALOGs.

The current record of the paused ALOG must be able to be applied to the block at some future time because the BSI would not be greater than the block's DSI without intervening actions on other ALOGs. When this occurs, the paused ALOG will be unpaused.

Not all of the ALOGs will be simultaneously paused because the actions were originally done in an order that agrees with the SI ordering for the blocks. Thus a merge of the ALOGs is always possible.

4. Redo Management a. Safe Point Determination

Many checkpointing techniques may be used with the present invention to make redo recovery even more efficient. For example, a Dirty Blocks table can be created to associate recovery management information with each dirty block. This information provides two important functions in managing the RLOG, and therefore the ALOG. First, the recovery management information is used in determining a "safe point" that governs RLOG scanning and truncation. Second, the information can be used in enforcing the WAL protocol for the RLOG as well as for potential undo logs.

Safe point determination is important to determine how much of the RLOG needs to be scanned in order to perform redo recovery. The starting point in the RLOG for this redo scan is called the "safe point." The safe point is "safe" in two senses. First, redo recovery can safely ignore records that precede the safe point since those records are all already included in the versions of blocks in persistent storage. Second, the "ignored" records can be truncated from the RLOG because they are no longer needed.

This second feature is not true for combined undo/redo logs. For example, if there were a long transaction which generated undo records, truncation may not be possible before the check point because the actions in the undo records may precede the actions in the redo records which have been written to the persistent storage. This would interfere with truncation.

Figure 9:
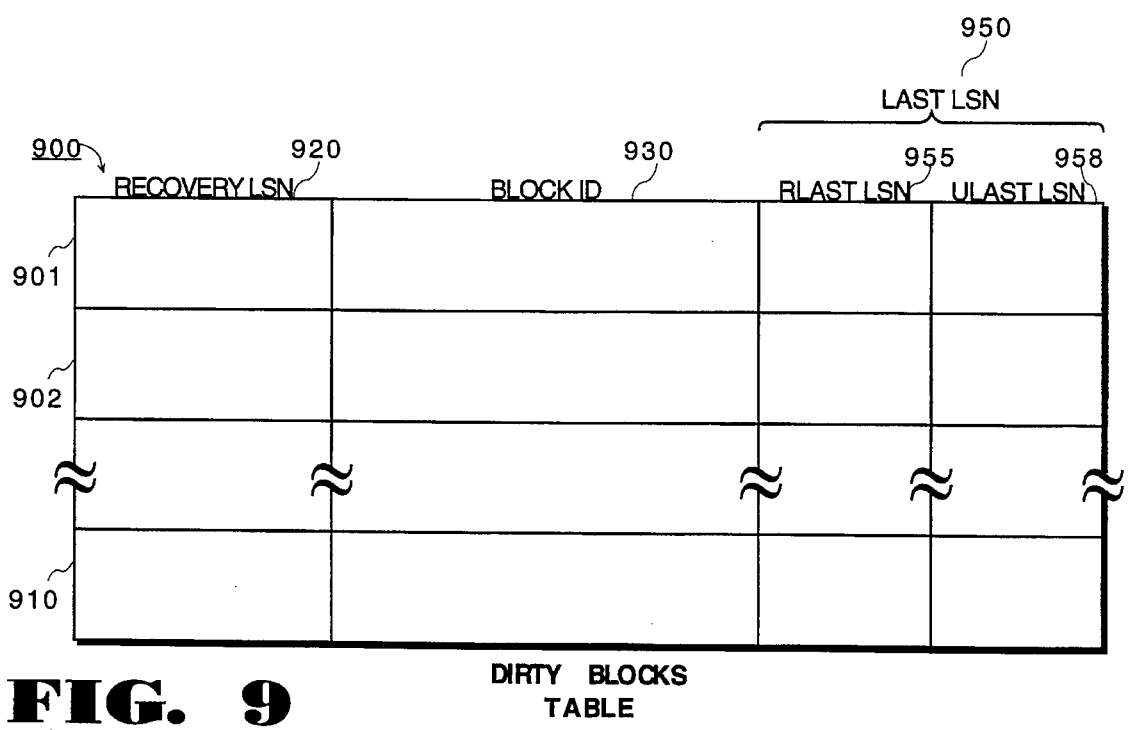
FIG. 9 is a diagram of a Dirty Blocks table.

Dirty Blocks table 900 is shown in FIG. 9. Preferably, the current copy of Dirty Blocks table 900 is maintained in volatile storage and is periodically stored into persistent storage in the RLOG as part of the checkpointing process. Dirty Blocks table entries 910, 901, and 902 include a recovery LSN field 920 and a Block ID field 930.

The values in the recovery LSN field 920 identify the earliest RLOG record whose action is not included in the version of the block in persistent storage. Thus the value of LSN field 920 is the first RLOG record that would need to be redone.

The value in Block ID field 930 identifies the block corresponding to the recovery LSN. Thus, Dirty Blocks table 900 associates with every dirty block the LSN of the RLOG record that made the block dirty.

Another entry in Dirty Blocks table 900 is the LastLSN entry 950. The value for this entry is, for each block, the LSNs of the RLOG and ULOG records that describe the last update to the block. LSNs are used rather than DSIs because it is necessary to determine locations in logs.

LastLSN 950 includes RLastLSN 955 (for the RLOG) and a list of ULastLSNs 958 (one for each of the ULOGs) which indicate, respectively, how much of the RLOG and ULOGs need to be forced when the block is written to persistent storage in order to enforce the WAL protocol. Enforcing the WAL protocol thus means that all actions incorporated into a block on persistent storage have both RLOG and ULOG records stably stored.

RLastLSN 955 and ULastLSN 958 are not included in the checkpoint (described below) because their role is solely to enforce the WAL protocol for the RLOG and ULOG. Hence, in the preferred implementation, these entries are kept separate from the recovery LSN to avoid storing them with the checkpoint information.

The earliest LSN for all blocks in a node's cache is the safe point for the redo scan in the local RLOG. Redo recovery is started by reading the local RLOG from the safe point forward and redoing the actions in subsequent records. All blocks needing redo have all actions needing to be redone encountered during this scan.

As explained above, the one-log assumption makes it possible to manage each RLOG in isolation. A node need only deal with its own RLOG, thus one node's actions will never be the reason for a block being dirty in some other node's cache. Hence, it is sufficient to keep a simple recovery LSN (one that does not name the RLOG) associated with each block, where it is understood that the recovery LSN identifies a record in the local RLOG.

b. Checkpointing

The purpose of checkpointing is to ensure that the determination of the safe point, as described above, can survive system crashes. Checkpointing can be combined with a strategy for managing blocks that permits the safe point to move and shrink the part of the log needed for redo. There are many different techniques for checkpointing. One is described below, but should not be considered to be a required technique.

The preferred technique for implementing this invention is a form of "fuzzy" RLOG checkpointing. It is called "fuzzy" because the checkpointing can be performed without concern for whether a transaction or an operation is completed.

Recovery of a version of the Dirty Blocks table 900 from the checkpointed information permits a determination of where to begin the redo scan. Only blocks in the Dirty Blocks table 900 need to be redone because only those blocks have actions which have not been stored into the persistent storage. As explained above, the Dirty Blocks table 900 indicates the earliest logged transaction that might need redoing.

System crash recovery via the RLOG and media recovery via the ALOG will typically have different safe points and will be truncated accordingly. In particular, a truncated portion of an RLOG may continue to be required for media recovery. If so, the truncated portion becomes part of the ALOG.

ALOG truncation uses RLOG checkpoints. An RLOG checkpoint determines a safe point which permits the truncation of the RLOG as of the time of the checkpoint. This is because all versions of the data in persistent storage are more recent than this safe point, or else the point would not be safe.

To truncate an ALOG, blocks on persistent storages are first backed up to archive storage. When this is complete, an archive checkpoint record is written to an agreed upon location, e.g., in archive storage, to identify the RLOG checkpoints that were current when determination of the archive checkpoint began.

An ALOG can be truncated at the safe point identified by the RLOG checkpoint named in the archive checkpoint for media recovery. All persistent storage blocks are written to archive storage after that RLOG checkpoint was done, and hence reflect all the changes made prior to this checkpoint's safe point. During block backup, several additional RLOG checkpoints may be taken. These do not affect ALOG truncation because there is no guarantee that the log records involved have all been incorporated into the states of blocks in archive storage. Actions that do not need to be redone but that are left on an ALOG are detected as not applicable and are ignored during the media recovery process.

Checkpoints are written to the RLOG. To find the last checkpoint written to the RLOG, its location is written to the corresponding node's persistent storage in an area of global information for the node. The most recent checkpoint information is typically the first information accessed during recovery. Alternatively, one can search the tail of the RLOG for the last checkpoint.

Checkpoints provide a major advantage of a pure RLOG which is that the system has explicit control over the size of the redo log and hence the time required for redo recovery. If the RLOG were combined with the ULOG, a safe point could not be used for log truncation for the reason explained above.

In addition, eliminating undo information from the RLOG allows the system to control log truncation by writing blocks to persistent storage. RLOG truncation never requires the abort of long transactions. This is not true when truncating logs containing undo information.

The system exercises control over the RLOG by writing blocks back to their locations in persistent storage. In fact, this writing of blocks is sometimes considered part of the checkpoint. Blocks may also be written to persistent storage that have recovery LSNs that are older, i.e., further back in the RLOG. This moves the safe point for the RLOG closer to the tail of the log. Log records whose operations are included in the newly-written block are no longer needed for redo recovery, and hence can be truncated.

Media recovery follows the same basic paradigm as system crash recovery. Versions of blocks are recorded stably in the archive storage. As explained above, each ALOG is formed from the truncated part of one of the RLOGs. The ALOG itself can be truncated periodically, based on what versions of blocks are in the archive storage.

With only a DSI stored in a block and not an LSN, it is not possible to know which log was last responsible for updating the archive storage block, nor where this record is in the RLOG. Thus, the information in the blocks is insufficient to determine the proper point to truncate the ALOGs or RLOGs. The Dirty Blocks table, however, can be used as a guide in truncating the RLOG. And an RLOG safe point can be used to establish an ALOG safe point.

F. ULOG Operations

1. ULOG Management

In addition to the advantages that separating RLOGs from ULOGs has on RLOG operation, there are also advantages that such separation has on ULOG operation. For example, a transaction-specific ULOG can be discarded once a transaction commits. Hence, space management for ULOGs is simple and undo information does not remain for long in persistent storage.

In addition, as explained below, durably writing undo records to the log can frequently be avoided. An undo record need only be written when a block containing uncommitted data is written to persistent storage.

One disadvantage of separate ULOGs and RLOGs on a redo log is that two logs must be forced when a block with uncommitted data is written to persistent storage in order to satisfy the WAL protocol. In general, however, writing blocks with uncommitted data to persistent storage should be sufficiently infrequent that the separation of logs provides a net gain, even in performance.

For N-log undo, multiple nodes can have uncommitted data in a block simultaneously. A system crash would require these transactions to all be undone, which may require, for example, locking during undo recovery to coordinate block accesses.

To ensure that all blocks will be one-log with respect to undo recovery, no block containing uncommitted data from one node is ever permitted to be updated by a second node. This can be achieved through a lock granularity that is no smaller than a block. A requesting node will then receive a block in which no undo processing by another node is ever required. Therefore, for example, if a transaction from another node had updated a block and then aborts, the effect of that transaction has already been undone.

Although one-log undo reduces complexity, the impact on system performance of N-log undo at recovery time is much less than for N-log redo. This is because only the small set of transactions that were uncommitted at the time of system crash needs undoing. And having lock granularity no smaller than a block may substantially decrease concurrency.

The technique of the present invention will usually avoid the need to write to the ULOG for a short transaction. This is because it will be rare that a cache slot containing a block with uncommitted data from any particular short transaction will be needed. The reasons for such rarity is because most short transactions should commit or abort prior to their cache slots being needed.

Should a cache slot to be stolen contain a block with uncommitted data, the WAL protocol requires the writing of undo records to all appropriate ULOGs. The WAL protocol is enforced for the ULOG by force-writing each ULOG through the records identified by ULastLSN in the Dirty Blocks table entry for the block. As explained above, ULastLSNs identify the undo records for the last update to the block in each ULOG.

With the WAL protocol, the information needed to store the states of blocks without updates of a transaction is always durably stored in a transaction's ULOG prior to overwriting the persistent storage version of the block with the new state. Hence, the state of blocks without the updates of a transaction is always durable prior to transaction commit. This information is either: (i) in the block version in persistent storage, (ii) "redo recoverable" from the version in persistent storage using the RLOG information from preceding transactions, or (iii) undo recoverable from a version produced by (i) or (ii) using the undo information which is either logged on the ULOG by the WAL protocol for this transaction, or created during redo recovery.

For the blocks on persistent storage that are still in a prior state, it is possible to have RLOG records without corresponding ULOG records. This is common where there is "optional" undo logging. It is also possible to have ULOG records without corresponding RLOG records for such blocks. In this case, the ULOG records can be ignored.

Thus, all actions needing to be undone after redo recovery need not be found in the ULOG. Should the system crash, the missing undo records need to be generated from the redo records and blocks' prior states. As long as an action depends only on the block state and value parameters of the logged action, the generation of undo records will be possible because all the information available when the action was originally performed is available at this point.

Actions end up on the ULOG for two reasons: either the WAL protocol forces a buffer record to the ULOG because the block was written to persistent storage, or the writing of the ULOG for WAL enforcement results in the writing of preceding ULOG records and, in some cases, following ULOG records that are in the undo buffer.

For these actions, it is not necessary to generate undo records during recovery because these records are guaranteed to be on a ULOG. This is important because it might not be possible to construct the ULOG record for the redo-logged transaction because the version of the block in persistent storage has a state that comes after the action. Fortunately, it is exactly these blocks for which ULOG records already exist.

During redo, the missing undo records would be generated. By the end of redo, the union of generated undo records and undo records on the ULOGs would be capable of rolling back all uncommitted transactions.

2. ULOG Optimization

With the present invention, the use of the ULOG can be optimized by making sure that the contents of an undo log buffer are written to a ULOG only when necessary. In general, the undo buffer need only be stored to a ULOG when a block containing uncommitted data from a current transaction is written to persistent storage. If the transaction has been committed, there will be no need to undo the updates in the transaction, and thus the undo buffer can be discarded.

Figure 10:
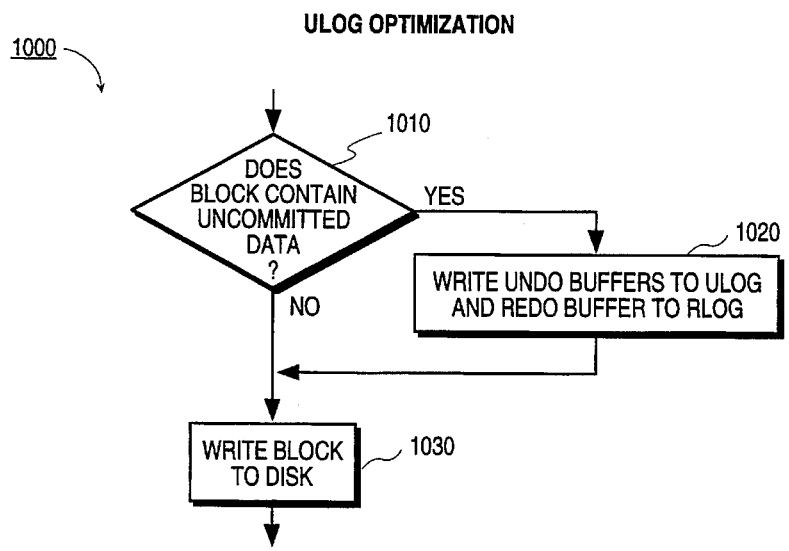
FIG. 10 is a flow diagram for implementing a write-ahead protocol to optimize undo log usage.

FIG. 10 shows a flow diagram 1000 of a procedure for implementing this ULOG optimization using the WAL protocol. It assumes that a version of the block is to be written to the persistent storage.

If the block to be written contains uncommitted data (step 1010), then the redo buffer needs to be written to the RLOG in the persistent storage, and any undo buffers are written to ULOGs in the persistent storage (step 1020).

After writing the redo buffers to the RLOG and the undo buffers to the ULOGs (step 1020), or if the blocks did not contain uncommitted data (step 1010), the block is written to the persistent storage (step 1030). This is in accordance with the WAL protocol.

Thus, the undo buffers are only written if there is uncommitted data to be stored. Each time a transaction commits, the corresponding undo log buffer can be discarded since it need not ever be written to the persistent storage. Furthermore, the ULOG itself for the transaction may be discarded as undo is now never required.

A committed transaction is made durable by the recording of all the redo records for the transaction in the RLOG in persistent storage. The updated block can be written to the persistent storage at some later time. Even if there were a crash before the updated block were written, the RLOG could be retrieved to restore the state of the block, the system knows a transaction is committed by storing a commit record in the RLOG.

3. Transaction Aborts

A ULOG can thus be discarded when a transaction commits, as undoing the effects of a transaction is no longer required. For transaction abort, the situation is somewhat different. Before the ULOG records for a transaction can be discarded, it is necessary to ensure that all blocks changed by an aborting transaction not only have their changes undone, but also that the resulting undone block states are durably stored somewhere other than in a ULOG. Either the blocks themselves in their undone state must be written to persistent storage (called a "FORCE" abort), or the undo transactions must be written and forced to the RLOG (called a "NO-FORCE" abort). Similar to committing transactions, logging actions on the RLOG obviates the need to force blocks to persistent storage in this case.

a. NO-FORCE Abort

A NO-FORCE abort can be realized by treating the undo operations as additional actions of the aborting transaction which reverse the effect of the previous updates. Such "compensating" actions are logged on the RLOG as "compensation log records" (CLRs).

Compensation log records are effectively undo records moved to the RLOG. Extra information is required, however, to distinguish these records from other RLOG records. In addition, an SI is needed to sequence the CLR correctly with respect to other logged transactions to be redone.

Figure 11:
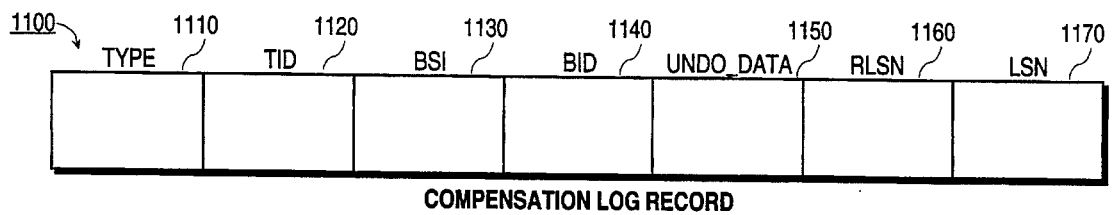
FIG. 11 is a diagram of a Compensation Log Record.

FIG. 11 shows a CLR 1100 with several attributes. TYPE attribute 1110 identifies this log record as a compensation log record.

TID attribute 1120 is a unique identifier for the transaction. It helps in finding the ULOG record corresponding to this RLOG CLR.

BSI attribute 1130 is the before state identifier, as described above. In this context, BSI attribute 1130 identifies the block state at the time that the CLR is applied.

BID attribute 1140 identifies the block modified by the action logged with this record.

UNDO_DATA attribute 1150 describes the nature of the action to be undone and provides enough information for the action to be undone after its associated original action has been incorporated into the block state. The value for the UNDO_DATA attribute 1150 comes from the corresponding undo record stored either in a ULOG or in an undo buffer.

RLSN attribute 1160 is the RLOG record which describes the same action for which this action is the undo. This attribute comes from the RLSN attribute 440 of the ULOG record.

LSN 1170, which need not be stored explicitly because it may be identified by its location in the RLOG, identifies this CLR uniquely on the RLOG. The LSN is used to control the redo scan and checkpointing of the RLOG.

As with transaction commit, when a transaction aborts, all redo records describing the actions of the transaction should be written to the RLOG. For the aborted transaction, this includes the undo actions in the CLRs. For a commit, the RLOG is forced to ensure that all redo records for the transaction are stably stored. For abort, this is not strictly necessary. The needed information still exists on the ULOG. However, the ULOG cannot be discarded until CLRs for the aborting transaction have been durably written to the RLOG. The CLRs on the RLOG will then substitute for the ULOG records.

A desirable property of the NO-FORCE approach is that for media recovery, only the redo phase is needed. Updates are applied in the order that they are processed during the ALOG merging. No separate undo phase is required while processing the ALOG because any needed undo is accomplished by applying CLRs..

A second table, called the Active Transactions table, records the information needed to effect undo operations. Like the Dirty Blocks table 900, the Active Transactions table becomes part of the checkpoint information on the RLOG so that its information is preserved if the system crashes.

The Active Transactions table indicates transactions that may need to be undone, the state of the undo/redo logging, and the undo progress. Enough information must be encoded in the Active Transactions table to ensure recovery from all system crashes, including those that occur during recovery itself. Some information which improves recovery performance may also be included.

FIG. 12 shows an example of an Active Transactions table 1200. Table 1200 includes records 1201, 1202, and 1207. Each of the records includes several attributes.

TID attribute 1210 is a unique identifier for the transaction. It is the same as the transaction identifier used for RLOG records.

STATE attribute 1220 indicates whether an active transaction is "prepared" as part of a two-phase commit. A two-phase commit is used when multiple nodes take part in a transaction. To commit such a transaction, all the nodes must first prepare the transaction (phase 1) before they can commit it (phase 2). The preparation is done to avoid partial commits which would occur if one node commits, but another aborts. A prepared transaction needs to be retained in the Active Transactions table 1200 because it may need to be rolled back. Unlike a non-prepared transaction, a prepared transaction should not be automatically aborted.

ULOGloc attribute 1230 indicates the location of the transaction-specific ULOG. This attribute need only be present should there be no other way to find the ULOG. For example, the TID 1210 might provide a substitute way of finding the ULOG for the transaction.

HIGH attribute 1240 indicates the RLOG LSN of the action which is the last action with an undo record written to the ULOG for this transaction. This ULOG record contains an RLOG LSN in RLSN such that RLOG records that follow RLSN need to be generated during redo after a system crash in order to be ready to roll back the transaction should it not have been committed.

NEXT attribute 1250 indicates the RLOG LSN of the next action in the transaction that needs to be undone. For transactions that are not being rolled back, NEXT attribute 1250 is the record number for the last action performed by the transaction.

Although some systems undo CLRs during recovery, they are not undone in the preferred embodiment. Instead, CLRs are tagged [via the TYPE attribute] so they can be identified during recovery.

Because of the sequential nature of the ULOG, when an undo record is forced to a ULOG, all preceding undo records are also guaranteed to be durable. RLOG records are written in the same order as the ULOG records. Hence, if an RLOG record is found that does not need redo, for example because its effect is already in the version of the block on persistent storage, then all preceding RLOG records have undo records in the ULOG. This occurred because the ULOG was forced when the block was written, hence all prior ULOG records were written at the same time. If undo records have been generated during redo for this transaction, they can be discarded as all such prior records must already exist in the ULOG.

The RLOG LSN of the last RLOG record for which a ULOG record was written is stored in HIGH attribute 1240 (FIG. 12) of the Active Transactions table entry for the transaction. RLOG records that precede this indicated redo log record do not generate undo records during redo because they all have ULOG records already. RLOG records following the one denoted by HIGH may need to have undo records generated.

Undo record generation can also be avoided if the number of undo records that has already been applied for each transaction is carefully monitored. Hence, the undo "high water mark" is encoded in the NEXT attribute 1250 of Active Transactions table 1200. The NEXT attribute 1250 contains the record number of the next undo record to be applied for the transaction.

During normal processing, the NEXT attribute 1250 is always the record number for a transaction's most recent transaction. The value in the NEXT attribute 1250 is incremented as these actions are logged. During undo recovery, the value in the NEXT attribute 1250 is decremented after every undo action is applied and its CLR is logged, naming its predecessor undo record as the next undo action. Should a system crash occur during rollback, undo records with record numbers higher than that indicated by the NEXT attribute 1250 need not be re-applied, and hence need not be generated again during redo.

The end result is that during redo, undo records are generated for the RLOG records whose record numbers fall in between the values for HIGH attribute 1240 and NEXT attribute 1250. Whenever the value of HIGH attribute 1240 is greater than or equal to the value of the NEXT attribute 1250, no undo records need be generated at all.

b. Force Abort

With the "FORCE" abort, CLRs are not written. Instead, when blocks are undone, the blocks themselves are forced to persistent storage. In this type of abort, the need is to stably retain knowledge that a block includes the result of applying an undo record, as well as the sequence in which the undo operations were performed, without writing a CLR for it.

The goal is to support N-log undo where several nodes may undo transactions on a single block as a result of a system crash. Hence, the progress of undo operations performed by each node must be stably recorded. This is what CLRs accomplish in the NO-FORCE case. Without CLRs, some other technique is required.

One alternative is to write the needed information into the block going to persistent storage. Although a CLR contains a complete description of the undo action, not all of this description is needed. What is needed in the FORCE abort case is to record the results of the undo transactions and which of them have been undone.

G. Normal Operations

During normal operation, Transaction Start, Block Update, Block Write, Transaction Abort, Transaction Prepare, and Transaction Commit operations have an impact on recovery needs. Hence, during normal operation, steps must be taken with respect to logging to assure that recovery is possible.

Figure 13:
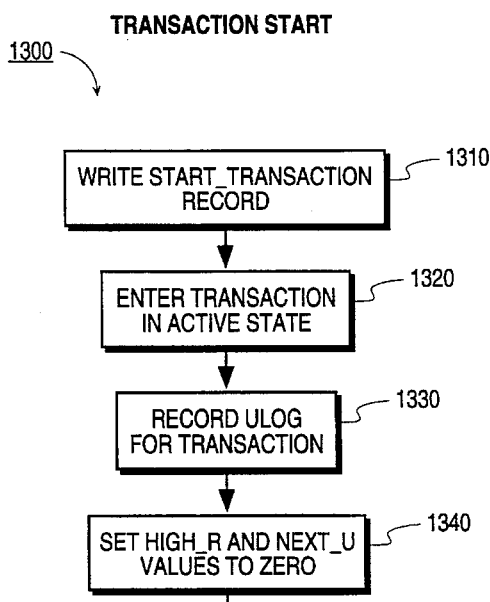
FIG. 13 is a flow diagram for a Transaction Start operation.

FIG. 13 contains a procedure 1300 for a Transaction Start Operations. First, a START_TRANSACTION record must be written to the RLOG (step 1310). Next, the transaction is entered into the Active Transactions table 1200 in the "active" state (step 1320). Then the ULOG for the transaction and its identity are recorded in ULOGloc 1230 (step 1330). Finally, the HIGH 1240 and NEXT 1250 values are set to zero (step 1340).

Figure 14:
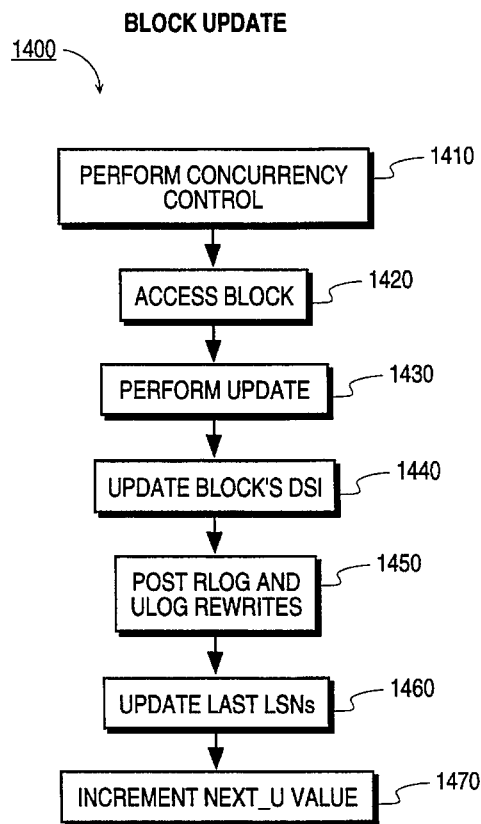
FIG. 14 is a flow diagram for a Block Update operation.

FIG. 14 shows a procedure 1400 for Block Update operation. First, the required concurrency control required is performed to lock the block for update (step 1410). The block is then accessed from persistent storage if it is not already in cache (step 1420). The indicated transaction is then performed upon the version of the block in cache (step 1430). Next, the block's DSI is updated with the ASI for the action (step 1440). Then, both RLOG and ULOG records are constructed for the update and are posted to their appropriate buffers (step 1450). The LastLSNs 950 (FIG. 9) are updated appropriately (step 1460). Then the NEXT 1250 value is set to the ULOG LSN of the undo record for this action (step 1470).

If the block was clean (step 1475), it is made dirty (step 1480). It is then put into the Dirty Blocks table 900 (FIG. 9), with the recovery LSN 920 set to the LSN of the RLOG record for it (step 1485).

Figure 15:
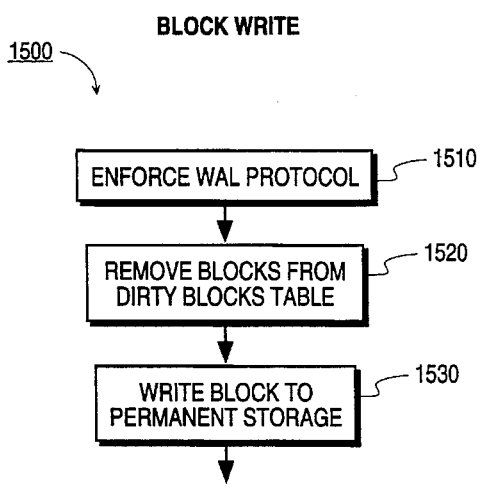
FIG. 15 is a flow diagram for a Block Write operation.

FIG. 15 contains a flow diagram 1500 for a Block Write operation if the block contains uncommitted data. First the WAL protocol is enforced (step 1510). Specifically, prior to writing the block to persistent storage, all undo buffers are written up to the corresponding LastULSN 958 (FIG. 9) for the block, and the RLOG buffer is written up to the LastRLSN 955 (FIG. 9). For each transaction identified in the LastULSNs for the block, set HIGH for these transactions to the RLOG LSN values in the RLSN attributes of the undo records identified by the LastULSN attributes from the Dirty Blocks Table. Each LastULSN must identify both a transaction via a TID and a ULOG LSN. For these logs, there are times when no writing need be done because these records have already been written.

The block is then removed from the Dirty Blocks table 900 (step 1520), and the block is written to persistent storage (step 1530). A block-write record may then be written to the RLOG to indicate that the block has been written to persistent storage, but this is optional. This block-write record need not be forced.

Figure 16:
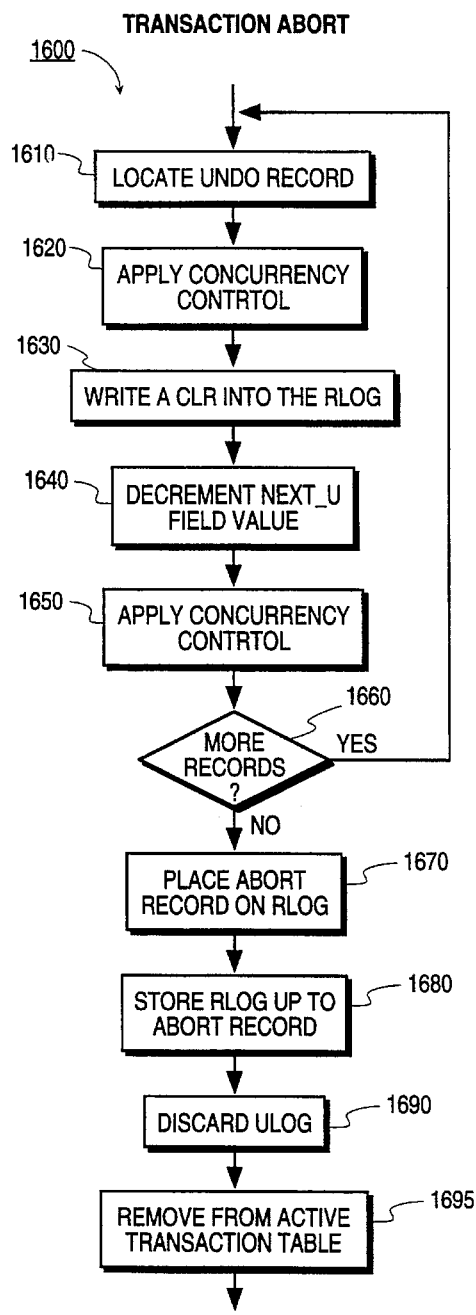
FIG. 16 is a flow diagram for a Transaction Abort operation.

FIG. 16 contains a flow diagram 1600 for a Transaction Abort operation. First, the undo record indicated by the value in NEXT- field 1250 is located (step 1610). Then the required concurrency control is performed on the blocks involved exactly as if they were being processed by normal updates (step 1620).

Next the current undo log record is applied to its designated block (step 1630), and a CLR for the undo action is written in the RLOG (step 1640). The value of NEXT field 1250 is then decremented to index the next undo log record to be applied (step 1640) as the "current" undo record.

If any undo log records remain for the transaction (step 1660), control is returned to step 1610. Otherwise an ABORT record is placed on the RLOG (step 1670). The RLOG is then stored to persistent storage up through the ABORT record (step 1680). The ULOG is then discarded (step 1690). Finally, the transaction is removed from the Active Transaction table 1200 (FIG. 12) (step 1695).

Figure 17:
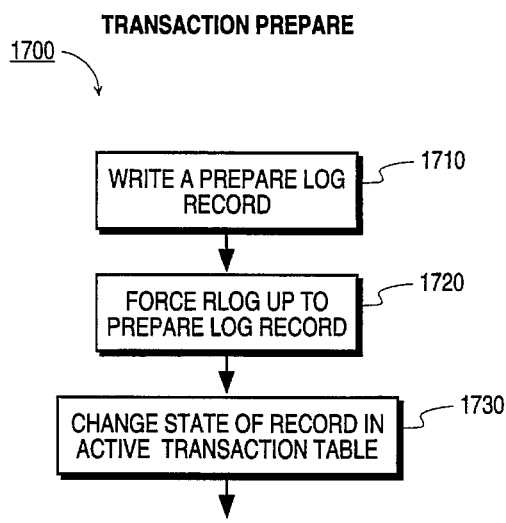
FIG. 17 is a flow diagram for a Transaction Prepare operation.

FIG. 17 shows a flow diagram 1700 for a Transaction Prepare operation. First, a prepare log record for the transaction is written to the RLOG (step 1710). Next, the RLOG is forced up through this prepare log record (step 1720). Finally, the state of the transaction being "prepared" is changed in the Active Transaction table 1200 (step 1730).

Figure 18:
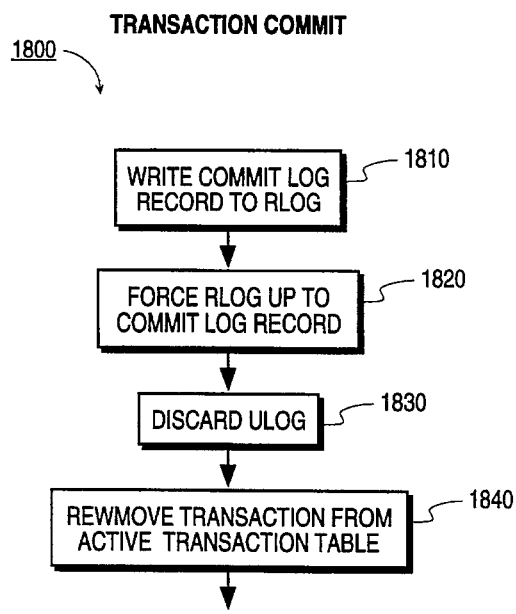
FIG. 18 is a flow diagram for a Transaction Commit operation.

FIG. 18 shows a flow diagram 1800 for a Transaction Commit operation. First, a commit log record for the transaction is written to the RLOG (step 1810). Next, the RLOG is forced up through this record (step 1820). Then the ULOG is discarded (step 1830). Finally, the transaction is removed from the Active Transaction table 1200 (step 1880).

H. System Crash Recovery Processing

In the preceding discussion, various aspects of logs, state identifiers, and recovery have been discussed. They can be combined into an effective recovery scheme in different methods. The preferred method is described below.

1. Analysis phase

An analysis phase is not strictly necessary. Without an analysis phase, however, some unnecessary work may be done during the other recovery phases.

The purpose of the analysis phase is to bring the system state as stored in the last checkpoint up to the state of the data base at the time the system crashed. To do this, the information in the last complete checkpoint on the RLOG is read and used to initialize the values for the Dirty Blocks table 900 (FIG. 9) and Active Transactions table 1200 (FIG. 12). RLOG records following this last checkpoint are then read. The analysis phase simulates the logged actions in their effects on the two tables.

With regard to the specific records, Start Transaction records are treated exactly like a start transaction operation with respect to the Active Transactions table. An Update Log records are treated exactly like a block update with respect to the Dirty Blocks table 900 and Active Transactions table 1200, but the update is not applied. Compensation Log records are treated exactly like a block update with respect to the Dirty Blocks table 900 and Active Transactions table 1200, except the value of the NEXT attribute 1250 is decremented, and the update is not applied.

For block-write records the block is removed from the Dirty Blocks Table 900. For Abort Transaction records, the transaction is deleted from the Active Transactions table 1200. For Prepare Transaction records, the state of the transaction in the Active Transactions table 1200 is set to "prepared." For Commit Transaction records, the transaction is deleted from the Active Transactions table 1200.

To restore the HIGH attribute 1240 for the transactions in Active Transactions table 1200, the ULOG must be accessed to find the RLSN attribute of the last record written to the ULOG. This LSN becomes the value for HIGH attribute 1240. Alternatively, the value for HIGH attribute 1240 from the checkpoint can be used or updated. This RLOG LSN can be used to avoid generating undo records for actions that are already recorded on the ULOG for a transaction. Only RLOG records for a transaction that follows this value needs to have undo information generated.

NEXT attribute 1250 is then either (1) the RLOG LSN of the last action whose log record is written to the RLOG for the transaction if that log record is for an update, or (2) the RLSN attribute of the last CLR written for the transaction. Thus the NEXT attribute 1250 can be restored during the analysis phase of the RLOG. NEXT attribute 1250 identifies, via the RLSN value in the ULOG records, the next undo record to be performed. It can also be used to avoid generating undo records for actions that have already been compensated by having CLRs written to undo them. Thus, redo records for a transaction with RLOG LSNs greater than the NEXT attribute 1250 for the transaction in the Active Transactions table 1200 do not need to have undo information generated for them as undo will be done when the existing CLRs are applied during the redo phase of recovery.

2. The redo phase

In the redo phase, all blocks indicated as dirty in the reconstructed Dirty Blocks table 900 are read into the cache. This read can be done in bulk, overlapped with the scanning of the RLOG.

Some blocks may be read by several nodes to determine whether they need to be involved in local redo, but only one of the nodes will actually perform redo for a block. This can, however, be almost completely avoided by writing block-write records to the RLOG. Because block-write records need not be forced, a block will occasionally be read from persistent storage when this is not necessary. The penalty for such a read is small, however.

A one-log version of every block exists in persistent storage, so only one node can have records in its log that have a BSI equal to the DSI of the block. This node is the one that will independently perform redo processing on the block. Hence, redo can be done in parallel by the separate nodes of the system, each with its own RLOG. No concurrency control is needed here.

The redo phase reconstructs the state of the node's cache by accessing the dirty blocks needing redo and posting the changes as indicated in the RLOG records. The resulting cache contains the dirty blocks in their states as of the time of the crash. Blocks that were subject to redo have been locked. The resulting Dirty Blocks table 900 and Active Transactions table 1200 are similarly reconstructed. Blocks that were subject to redo have been locked.

Only redo records for dirty blocks as indicated in the Dirty Blocks table 900 after the analysis phase may need to be redone. The redo scan of the RLOG starts at the earliest recovery LSN 920 recorded in the Dirty Blocks table 900. This is the safe point for redo. Hence, all updates to every block since it was written to persistent storage are assured of being included in the redo scan.

As explained above, there are only two cases that can arise when trying to apply an RLOG record to its corresponding block. If the RLOG record's BSI is not equal to the block's DSI, the logged action can be ignored. If instead the RLOG record's BSI is equal to the blocks's DSI, the appropriate redo activity is performed.

The redo phase method involves repeating history. All update RLOG records, starting with the RLOG record denoted by a block's recovery LSN, are applied, even those that belong to transactions that will need to be undone subsequently. The principle here is that for an action to be redone, it needs to be applied to the block in exactly the state to which the original action was applied.

In the application of an RLOG record to a block, the block's DSI is updated to the ASI for the redone action. The node requests an appropriate lock on the block when an RLOG action is applied. Redo need not wait for the lock to be granted, since no other node will request a lock. The requested locks must, however, be granted prior to the start of undo. This is the way concurrency control is initialized for the undo phase.

If a normal update logged on the RLOG needs redo, an ULOG record may need to be generated for it. All RLOG redo records for a transaction with LSNs between the HIGH and NEXT values will have undo information generated for them. That information preferably includes ULOG records with RLSN attributes that identify these records.

If an action is not required to be redone, earlier undo records that may have been generated inappropriately are discarded because the ULOG has been written, via the WAL protocol, to persistent storage up to the ULOG record for this action. The HIGH attribute 1240 can be updated at this time with the RLOG LSN of this record which will, should a checkpoint be taken, reduce the redundant undo record generation during subsequent recovery should the current recovery process fail.

For each transaction, generated undo records are stored in the transaction's ULOG buffer. These undo records, plus those on its ULOG and its CLRs, ensure that an active transaction can be rolled back. Hence, at the end of the redo phase, all necessary undo log records will exist.

3. The undo phase

Undo recovery is N-log. Hence, the undo recovery phase needs concurrency control in the same way that it is needed during transaction rollback. Multiple nodes may need to undo changes to the same block. Normal data base activity can resume once the undo phase begins, however, just as normal activity can proceed concurrently with transaction abort. All the appropriate locking is in place to permit this. This is ensured by not starting the undo phase until all nodes have completed the redo phase. Hence, all locks requested by any node during redo are held by the appropriate node prior to undo beginning.

First all active transactions (but not prepared transactions) in Active Transactions table 1200 are rolled back. Undo processing proceeds exactly as in rolling back explicitly aborted transactions, with one exception. Some undo records might be present both in an undo buffer, where they were regenerated during redo, and in a ULOG in persistent storage. These duplicate undo records can be detected and ignored. This can be encapsulated in a routine to get the next undo record, so that the remainder of the code to undo transactions active at time of crash can be virtually identical to the code needed to undo a transaction when the system is operating normally. Redundant ULOG records among these sources can be eliminated because all undo records are identified by the LSN of the RLOG record to which they apply.

V. CONCLUSION

The use of separate RLOGs and ULOGs permits the optimization of logging operation by making sure that the undo information is only stored to a ULOG when absolutely necessary. The test for when such a necessity arises is whether all the information needed for changes involved in uncommitted transactions has been stored or can be recreated.

Further optimization can be obtained by keeping counts of the changes made during recovery.

It will be apparent to persons of ordinary skill in the art that modifications and variations can be made without departing from the spirit and scope of this invention. For example, the architecture shown in FIG. 1 may be different, and the number of undo and redo logs assigned to each node can vary. The present invention covers such modifications and variations which come within the scope of the appended claims and their equivalents.

What is claimed is:

1. A data processing recovery apparatus comprising:

a redo buffer containing a set of redo records, said redo buffer including information for committed and uncommitted transactions;

an undo buffer containing a set of undo records, said undo buffer including information only for an uncommitted transaction, said undo records being aggregated in said undo buffer separately from said redo records in said redo buffer; and a log management routine for starting an uncommitted transaction, recording redo records corresponding to said uncommitted transaction in said redo buffer, recording undo records for said uncommitted transaction in said undo buffer, committing said transaction, storing said redo records corresponding to said committed transaction from said redo buffer to persistent storage, and for separately discarding said undo records corresponding to said committed transaction from said undo buffer while retaining said redo records in said redo buffer.

2. The data processing recovery apparatus as claimed in claim 1 further including an active transactions table stored in a memory and containing entries corresponding to transactions which have not been committed.

3. The data processing recovery apparatus as claimed in claim 2 further including a means for removing from said active transactions table an entry corresponding to a first transaction after said first transaction is committed.

4. The data processing recovery apparatus as claimed in claim 2 further including a means for storing the contents of said undo buffer in said persistent storage prior to storing changes from corresponding uncommitted transactions.

5. A method for data processing recovery comprising the steps of:

providing a redo buffer containing a set of redo records, said redo buffer including information for committed and uncommitted transactions;

providing an undo buffer containing a set of undo records, said undo buffer including information only for an uncommitted transaction, said undo records being aggregated in said undo buffer separately from said redo records in said redo buffer;

starting an uncommitted transaction;

recording redo records corresponding to said uncommitted transaction in said redo buffer;

recording undo records for said uncommitted transaction in said undo buffer;

committing said transaction;

storing said redo records corresponding to said committed transaction from said redo buffer to persistent storage; and separately discarding said undo records corresponding to said committed transaction from said undo buffer while retaining said redo records in said redo buffer.

6. The method as claimed in claim 5 further including the step of providing an active transactions table stored in a memory and containing entries corresponding to transactions which have not been committed.

7. The method as claimed in claim 6 further including the step of removing from said active transactions table an entry corresponding to a first transaction after said first transaction is committed.

* * * * *